United States Patent [19]

Sako

[11] Patent Number: 4,954,668

[45] Date of Patent: Sep. 4, 1990

[54] APPARATUS FOR RESETTING APPLIANCE

[75] Inventor: Yuji Sako, Nagoya, Japan

[73] Assignee: Mitsubishi Denki Kabushiki Kaisha, Tokyo, Japan

[21] Appl. No.: 224,221

[22] Filed: Jul. 22, 1988

Related U.S. Application Data

[63] Continuation of Ser. No. 923,881, Oct. 28, 1986, abandoned.

[30] Foreign Application Priority Data

Dec. 13, 1985 [JP] Japan ............................ 60-190965[U]

[51] Int. Cl.$^5$ ............................................. H01H 9/00
[52] U.S. Cl. .................................... 200/314; 200/331; 200/DIG. 47
[58] Field of Search .............. 200/311, 314, 313, 331, 200/DIG. 47; 116/DIG. 28, 299, 202

[56] References Cited

U.S. PATENT DOCUMENTS

| | | | |
|---|---|---|---|
| 2,203,309 | 6/1940 | Schmid | 200/313 |
| 2,244,326 | 6/1941 | Bone et al. | 200/313 |
| 2,904,662 | 9/1959 | Spring | 200/314 |
| 3,780,248 | 12/1973 | Martin | 200/311 |
| 3,819,928 | 6/1974 | Kuroyama et al. | 200/313 |
| 4,071,726 | 1/1978 | Werda | 200/311 |
| 4,218,775 | 8/1980 | Cox et al. | 200/DIG. 47 |
| 4,225,766 | 9/1980 | Pfeifer et al. | 200/314 |
| 4,306,131 | 12/1981 | St. John | |
| 4,398,075 | 8/1983 | Vogel | 200/314 |
| 4,410,873 | 10/1983 | Kuratani | |
| 4,459,448 | 7/1984 | McDill | 200/311 |

FOREIGN PATENT DOCUMENTS

| | | |
|---|---|---|
| 810729 | 8/1951 | Fed. Rep. of Germany . |
| 1425134 | 8/1970 | Fed. Rep. of Germany . |
| 2147765 | 6/1972 | Fed. Rep. of Germany . |
| 2853497 | 6/1980 | Fed. Rep. of Germany . |
| 8418100 | 9/1984 | Fed. Rep. of Germany . |
| 1354109 | 5/1974 | United Kingdom . |
| 2173950 | 10/1986 | United Kingdom . |

OTHER PUBLICATIONS

IBM Technical Disclosure Bulletin, "Changeable Keyboard", vol. 11, No. 7, Dec. 1968, pp. 692-693, author K. D. Arfman.
IBM Tech. Disclosure Bulletin, author R. W. Callahan, "Electrostatic Light Switch", vol. 12, No. 6, Nov. 1969, pp. 854.

Primary Examiner—Linda J. Sholl
Attorney, Agent, or Firm—Burns, Doane, Swecker & Mathis

[57] ABSTRACT

In a resetting apparatus having an inner cable one end of which confronts a reset button of an appliance mounted inside a control panel and the other end of which is connected with a push button protruded outside the control panel, and an outer cable which envelops the inner cable and which is fixed to a front of the control panel at one end therof and to the appliance at the other end thereof, the push button being depressed thereby to depress the reset button of the appliance; an apparatus for resetting an appliance characterized in that the inner cable is made of an optical conductor, and that a light emitting device is mounted in the reset button of the appliance.

4 Claims, 1 Drawing Sheet

APPARATUS FOR RESETTING APPLIANCE

This application is a continuation of application Ser. No. 923,881, filed Oct. 28, 1986 now abandoned.

BACKGROUND OF THE INVENTION

The present invention relates to an apparatus for resetting an appliance for example, thermal relay through a manipulation outside a control panel.

A thermal relay, for example, needs to be reset when it is in the operating state. In order to know this state, an operation indicating lamp has heretofore been separately provided outside a control panel. A prior-art apparatus is shown in FIG. 2. Referring to the FIG., numeral 1 designates the appliance such as thermal relay which is mounted inside the control panel, and which has a reset button 2. A cable end member 3 is fixed to one end of an inner cable 4, and confronts the reset button 2. An outer cable 5 is such that a steel wire closely coiled is coated with an elastic resin 5a, and it is flexible. The end of the outer cable 5 near to the appliance 1 is fixed to a casing cap 6. Further, the casing cap 6 is fixed to a mounting cover 7 by a retaining ring 8. The mounting cover 7 is fixed to the appliance 1 by the claw portion 7a thereof. Shown at numeral 9 is the front of the control panel, such as the door of the control panel. The side of the outer cable 5 near to the panel front 9 is fixed to a holder 10, which in turn is clamped and fixed to the panel front 9 by a nut 11. The side of the inner cable 4 near to the panel front 9 is fixed to a rod 12, which in turn is fixed to a push button 13. A return spring 14 is compressively arranged between the rod 12 and the outer cable 5, and it urges the inner cable 4 leftwards as viewed in the figure. When the push button 13 is depressed rightwards as viewed in the figure against the urging force of the return spring 14, the inner cable 4 is moved rightwards, and the cable end member 3 depresses the reset button 2 to reset the operating state of the appliance 1.

The prior-art device is intended to reset the appliance in the state in which the door of the control panel is shut. Therefore, it is naturally impossible to visually acknowledge if the appliance inside the control panel has operated. With the prior-art device, accordingly, the operation needs to be indicated in such a way that an operation indicating lamp (not show) or the like disposed outside the panel is lit up using, for example, the auxiliary contact (not shown) of the appliance (such as thermal relay) inside the panel.

SUMMARY OF THE INVENTION

This invention has been made in view of the above drawback, and has for its object to provide a resetting apparatus which also effects operation indication.

In order to solve the problem of the prior art, the present invention provides an apparatus for resetting an appliance having an inner cable one end of which confronts a reset button of the appliance mounted inside a control panel and the other end of which is connected with a push button protruded outside the control panel, and an outer cable which envelops the inner cable and which is fixed to a front of the control panel at one end thereof and to the appliance at the other end thereof, the push button being depressed thereby to depress the reset button of the appliance; characterized in that said inner cable is made of an optical conductor, and that a light emitting device is mounted in said reset button of said appliance.

When the appliance has started to light up the light emitting device, a light beam passes through the inner cable made of the optical conductor and emerges out of the control panel thereby to indicate the operation of the appliance. After the operating state or non-operating state of the appliance is acknowledged through the indication, the appliance can be reset by manipulating the push button.

PREFERRED EMBODIMENT OF THE INVENTION

Figure 1:
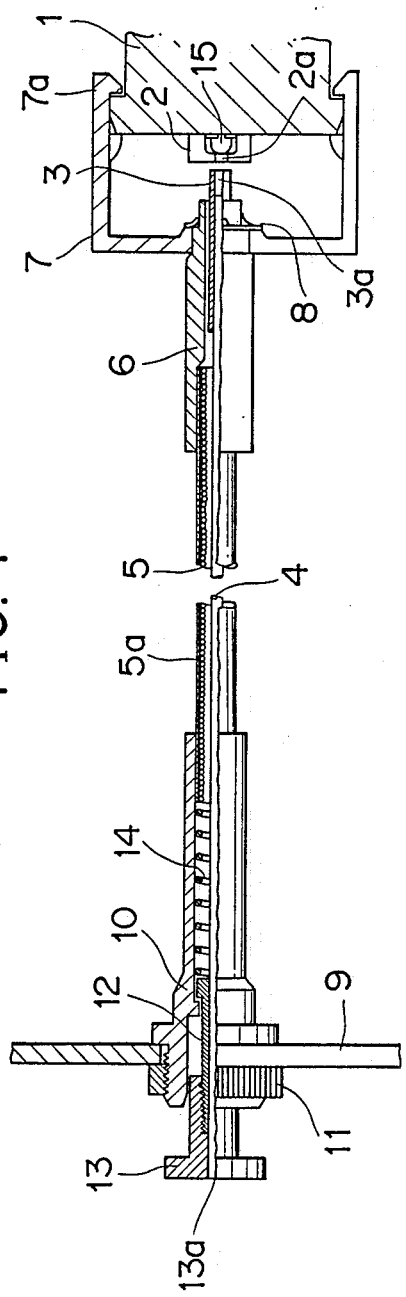
FIG. 1 is a schematic view showing the arrangement of a embodiment of the present invention.
Figure 2:
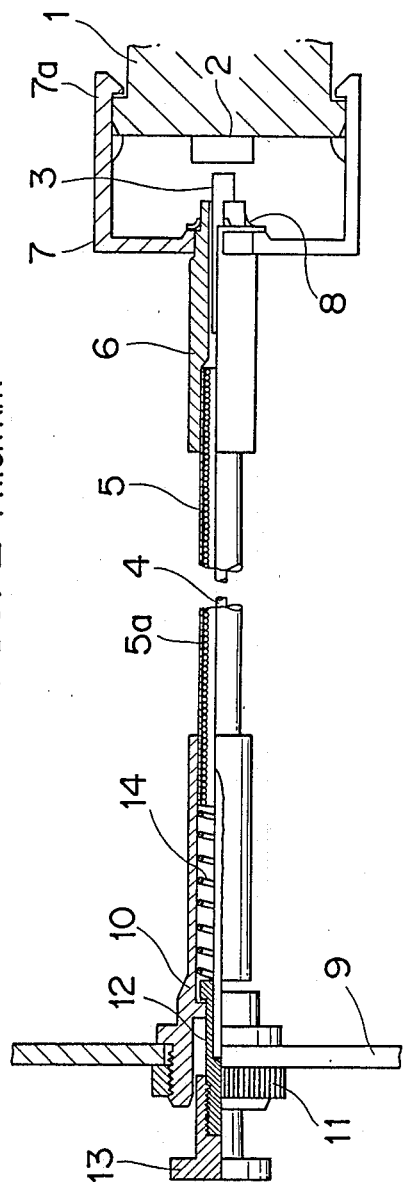
FIG. 2 is a schematic view of a prior-art example.

FIG. 1 shows one embodiment of the present invention, in which the same numerals as in FIG. 2 indicate identical portions. An inner cable 4 is made of an optical conductor such as optical fiber plastics, and is fixed with a structure in which it extends from a push button 13 to a cable end member 3. The push button 13 and the cable end member 3 are respectively provided with holes 13a and 3a for passing a light beam. Numeral 15 designates a light emitting device such as light emitting diode, which is connected through the auxiliary contact (not shown) of an appliance 1 and which is turned 'on' or lit up during the operation of the appliance 1. In the embodiment, the light emitting device 15 is built in a reset button 2 and gives forth the light beam from a hole 2a.

Next, the operation of the embodiment will be described.

When the appliance 1 has operated to light up the light emitting device 15, the light beam is propagated along a path consisting of the hole 2a → the hole 3a → the inner cable (optical fiber plastics) 4 → the hole 13a, and it is given forth to the exterior (to the left side of the door 9 of a control panel) so as to indicate the operation of the appliance 1. It is the same as in the operation of the prior-art apparatus that, after observing the indication, the push button 13 is depressed right-wards to reset the appliance 1.

Thus, according to the present invention, the operation of the appliance is indicated on the face of the push button by the light emission, so that the operating or non-operating state of the appliance is clear and is readily judged. Moreover, since the resetting apparatus functions also to indicate the operation of the appliance, an operation indicating lamp or the like need not be separately disposed, to bring forth the advantage that the fabricating cost of the control panel lowers and that an inexpensive apparatus can be supplied.

What is claimed is:
1. In a resetting apparatus having an inner cable with first and second ends, said first end including an end member for contacting a reset button of an appliance mounted inside a control panel, said second end being connected to a push button protruding outside said control panel, and an outer cable enveloping said inner cable, said outer cable being fixed at one end to said control panel and to said appliance at the other end thereof, said reset button being depressed by said end member when said push button is depressed, the improvement comprising a light emitting means mounted in said reset button for indicating an operation mode of said appliance, and said inner cable including a flexible portion extending between said end member and said second end, said flexible portion being made of an optical conductor, said optical conductor being housed within said end member said end member having an aperture for transmitting light from said light emitting means to said optical conductor, whereby light emitted from said light emitting means is directed towards said push button.

2. A resetting apparatus as claimed in claim 1, wherein said appliance is a thermal relay.

3. A resetting apparatus as claimed in claim 1, wherein said optical conductor is optical fiber plastics.

4. A resetting apparatus as claimed in claim 1, wherein light emitting means is a light emitting diode.

* * * * *